(12) United States Patent
Tian et al.

(10) Patent No.: US 10,403,938 B2
(45) Date of Patent: Sep. 3, 2019

(54) TERMINAL DEVICE AND CHARGE CONTROL METHOD USING DUAL PROCESSOR WITH BIDIRECTIONAL COMMUNICATION

(71) Applicant: Guangdong Oppo Mobile Telecommunications Corp., Ltd., Dongguan (CN)

(72) Inventors: Chen Tian, Dongguan (CN); Jun Zhang, Dongguan (CN); Jialiang Zhang, Dongguan (CN); Fuchun Liao, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 211 days.

(21) Appl. No.: 15/325,724

(22) PCT Filed: Sep. 24, 2015

(86) PCT No.: PCT/CN2015/090620
§ 371 (c)(1),
(2) Date: Jan. 12, 2017

(87) PCT Pub. No.: WO2017/049551
PCT Pub. Date: Mar. 30, 2017

(65) Prior Publication Data
US 2017/0294690 A1    Oct. 12, 2017

(51) Int. Cl.
*H02J 7/00* (2006.01)
*G06F 3/00* (2006.01)
(Continued)

(52) U.S. Cl.
CPC ............ *H01M 10/446* (2013.01); *G06F 8/61* (2013.01); *H01M 10/42* (2013.01); *G06F 8/654* (2018.02); *H04B 1/38* (2013.01)

(58) Field of Classification Search
CPC ....... Y02E 60/12; H02J 7/0022; H02J 7/0068; H02J 7/0073; H02J 2007/006;
(Continued)

(56) References Cited

U.S. PATENT DOCUMENTS

2003/0076072 A1  4/2003  Tojo et al.
2003/0135705 A1  7/2003  Montero
(Continued)

FOREIGN PATENT DOCUMENTS

CN        1551617 A      12/2004
CN      101814635 A       8/2010
(Continued)

*Primary Examiner* — Richard Isla
*Assistant Examiner* — Mohammed J Sharief
(74) *Attorney, Agent, or Firm* — Hodgson Russ LLP

(57) ABSTRACT

A terminal device and a charge control method are provided by the disclosure. The terminal device includes a first processor, which includes a first communication interface. The first processor receives a firmware transmitted by a second processor through the first communication interface when the first communication interface is open, and reads control instructions recorded in the firmware when the terminal device is coupled to an adapter, to control the adapter to charge the terminal device, wherein when the first processor stores no firmware, the first communication interface is open; a second processor acquires the firmware from a server, and when the first communication interface is open, transmits the firmware by the first communication interface. Therefore, the improved charge method based on the control of the terminal device is more practical and universal.

18 Claims, 4 Drawing Sheets

(51) Int. Cl.
*G05B 19/18* (2006.01)
*H01M 10/44* (2006.01)
*H01M 10/42* (2006.01)
*G06F 8/61* (2018.01)
*H04B 1/38* (2015.01)
*G06F 8/654* (2018.01)

(58) Field of Classification Search
CPC ........... H02J 2007/0062; H01M 10/44; H01M 10/446; H01M 10/42; G06F 8/61; G06F 8/654; G06F 13/14; G06F 13/20; G06F 13/36; G06F 13/385; G06F 13/4027; G06F 13/4045; H04B 1/38
USPC .................................. 320/137; 710/36; 700/2
See application file for complete search history.

(56) References Cited

U.S. PATENT DOCUMENTS

| | | |
|---|---|---|
| 2005/0001586 A1 | 1/2005 | Tashiro |
| 2008/0052699 A1 | 2/2008 | Baker |
| 2010/0213891 A1 | 8/2010 | Nishikawa et al. |
| 2012/0221703 A1* | 8/2012 | Schwager .................. B60L 1/04 709/223 |
| 2013/0145184 A1* | 6/2013 | Tatsumoto .............. G06F 1/263 713/300 |
| 2014/0089692 A1* | 3/2014 | Hanafusa ............... H01M 10/48 713/310 |
| 2014/0208092 A1 | 7/2014 | Huang |
| 2014/0380029 A1* | 12/2014 | Tokuda ............. H04M 1/72569 713/1 |
| 2015/0263638 A1* | 9/2015 | Yang ...................... H02M 7/04 363/125 |
| 2015/0358912 A1* | 12/2015 | Tsukamoto ........ G06Q 20/3278 370/311 |

FOREIGN PATENT DOCUMENTS

| | | |
|---|---|---|
| CN | 102033593 A | 4/2011 |
| CN | 103942061 A | 7/2014 |
| EP | 1253663 A1 | 10/2002 |

\* cited by examiner

300

Acquiring a firmware from a server by a second processor of the at least two processors, and transmitting the firmware to the first processor through a first communication interface when the first communication interface configured by a first processor included in the at least two processors is open, wherein the first communication interface is open when the first processor stores no firmware  — S310

Reading control instructions recorded in the firmware by the first processor, to control the adapter to charge the terminal device, when the terminal device is coupled to an adapter  — S320

FIG. 5

TERMINAL DEVICE AND CHARGE CONTROL METHOD USING DUAL PROCESSOR WITH BIDIRECTIONAL COMMUNICATION

CROSS REFERENCE TO RELATED APPLICATIONS

This is the U.S. National Stage of International Application No. PCT/CN2015/090620, filed Sep. 24, 2015, which is incorporated by reference herein in its entirety.

BACKGROUND

1. Field

The present disclosure relates to a field of charging technology, and more specifically to a terminal device and a charge control method.

2. Description of Related Art

At present, a charge technology based on control of a terminal device (such as quick charging technology) is well known, such as communicating with an adapter, by the terminal device. It transmits related parameters (such as temperature of a battery, or power, and so on) for charge control, thus to control the charging based on the related parameters, so as to improve speed or security of the charging.

However, in the above technology, actions and process of the terminal device are dependent on control instructions recorded in firmware stored in a processor of the terminal device, and the firmware is stored in the processor during a manufacturing process of the processor or the terminal device by the manufacturer. Therefore, in the quick charging technology, the terminal device can only run the above charging process with the adapter controlled by the stored firmware, seriously affecting utility and universality of the charging technology, based on the control of the terminal device.

SUMMARY OF THE DISCLOSURE

The present disclosure provides a terminal device and a charge control method, to improve the charge method based on the control of the terminal device to be more utility and universality.

In a first aspect, a terminal device which is provided, includes: a first processor, including a first communication interface, configured to receive a firmware transmitted by a second processor through the first communication interface when the first communication interface is open, and read control instructions recorded in the firmware when the terminal device is coupled to an adapter, to control the adapter to charge the terminal device, wherein when the first processor stores no firmware, the first communication interface is open; a second processor, configured to acquire the firmware from a server, and when the first communication interface is open, transmit the firmware by the first communication interface.

Combined with the first aspect, in a first embodiment of the first aspect, the first communication interface is closed when the firmware is stored in the first processor.

Combined with the first aspect and the above-mentioned embodiment thereof, in a second embodiment of the first aspect, the first processor further includes a second communication interface maintained open, the first processor is configured to receive a trigger information through the second communication interface when the first communication interface is closed, according to the trigger information, the first processor is further configured to open the first communication interface to receive a firmware update file for the stored firmware transmitted by the second processor through the first communication interface, and based on the firmware update file, update the stored firmware; the second processor is configured to acquire the firmware update file from the server for the firmware stored in the first processor, and transmit the firmware update file to the first processor through the first communication interface when the first communication interface is open.

Combined with the first aspect and the above-mentioned embodiments, in a third embodiment of the first aspect, the trigger information is sent specifically by the second processor.

Combined with the first aspect and the above-mentioned embodiments, in a fourth embodiment of the first aspect, the trigger information is sent specifically after the second processor acquires the firmware update file.

Combined with the first aspect and the above-mentioned embodiments, in a fifth embodiment of the first aspect, the trigger information is sent specifically by the adapter.

Combined with the first aspect and the above-mentioned embodiments, in a sixth embodiment of the first aspect, the first processor, through the first communication interface is further configured to send a version instruction to the second processor, the version instruction is configured to indicate a version of the firmware stored in the first processor; the second processor is configured to determine the firmware update file transmitted to the first processor, according to the version instruction.

Combined with the first aspect and the above-mentioned embodiments, in a seventh embodiment of the first aspect, the first processor is configured to send the version instruction to the second processor, through the first communication interface, after determining the terminal device is restarted and coupled to the adapter in a first time.

Combined with the first aspect and the above-mentioned embodiments, in an eighth embodiment of the first aspect, the adapter is configured to charge the terminal device in a quick charging mode.

Combined with the first aspect and the above-mentioned embodiments, in a ninth embodiment of the first aspect, the second processor is configured to forbid the communication between the first processor and the adapter, before determining that the adapter is charging the terminal device in the quick charging mode.

In a second aspect, a charge control method which is provided, applied in a terminal device comprising at least two processors, the method includes: acquiring a firmware from a server by a second processor of the at least two processors, and transmitting the firmware to the first processor through a first communication interface when the first communication interface of the first processor included in the at least two processors is open, wherein the first communication interface is open when the first processor stores no firmware; reading control instructions recorded in the firmware by the first processor, to control the adapter to charge the terminal device, when the terminal device is coupled to an adapter.

Combined with the second aspect, in a first embodiment of the second aspect, the first communication interface is closed when the first processor stores the firmware.

Combined with the second aspect and the above-mentioned embodiment thereof, in a second embodiment of the second aspect, the first processor includes a second communication interface maintained open, the method further includes: acquiring a firmware update file by the second processor from the server for the firmware stored in the first processor; receiving a trigger information through the second communication interface by the first processor, when the first communication interface is closed; opening the first communication interface by the first processor according to the trigger information; receiving the firmware update file for the stored firmware transmitted by the second processor, through the first communication interface, by the first processor; updating the stored firmware, by the first processor based on the firmware update file.

Combined with the second aspect and the above-mentioned embodiments thereof, in a third embodiment of the second aspect, the trigger information is sent specifically by the second processor.

Combined with the second aspect and the above-mentioned embodiments thereof, in a fourth embodiment of the second aspect, the trigger information is sent specifically after the second processor acquires the firmware update file.

Combined with the second aspect and the above-mentioned embodiments thereof, in a fifth embodiment of the second aspect, the trigger information is sent specifically by the adapter.

Combined with the second aspect and the above-mentioned embodiments thereof, in a sixth embodiment of the second aspect, the method further includes: sending a version instruction to the second processor through the first communication interface by the first processor, the version instruction is configured to indicate a version of the firmware stored in the first processor; transmitting the firmware update file to the first processor, according to the version instruction, by the second processor.

Combined with the second aspect and the above-mentioned embodiments thereof, in a seventh embodiment of the second aspect, before sending the version instruction to the second processor, through the first communication interface by the first processor, the method further includes: determining, by the first processor, a current connection state of the terminal device after the terminal device is restarted recently and coupled to the adapter in a first time.

Combined with the second aspect and the above-mentioned embodiments thereof, in an eighth embodiment of the second aspect, the adapter is configured to charging the terminal device in a quick charging mode.

Combined with the second aspect and the above-mentioned embodiments thereof, in a ninth embodiment of the second aspect, the method further includes: forbidding the communication between the first processor and the adapter, before the second processor determining the adapter is charging the terminal device in the quick charging mode.

Based on the terminal device and the charge control method provided by the embodiments of the present disclosure, the first processor of the terminal device includes the first communication interface. The first communication interface is open when the first processor stores no firmware. Therefore, the second processor can transmit the firmware acquired from the server to the first processor through the first communication interface, when the first processor stores no firmware. Furthermore, the second processor can read the control instruction recorded in the firmware, to control the adapter to charge the terminal device, and can acquire the firmware from the server suited for the adapter according to a coupled adapter. Therefore, the charge method based on the control of the terminal device can be improved to have more utility and universality.

BRIEF DESCRIPTION OF THE DRAWINGS

In order to describe clearly the embodiment in the present disclosure, the following will introduce the drawings for the embodiment shortly. Obviously, the following description is only a few embodiments, for the common technical personnel in the field it is easy to acquire some other drawings without creative work.

FIG. 5 is a flowchart of a charge control method according to another embodiment of the present disclosure.

DETAILED DESCRIPTION OF THE PREFERRED EMBODIMENTS

The following description is based on the specifically illustrated embodiment of the present disclosure, which obviously is only a specific embodiment of the present disclosure, rather than all embodiments of the present disclosure. The other embodiments which are obtained by a person skilled in the art based on the specifically illustrated embodiment of the present disclosure, fall within the protected scope of the present disclosure.

Figure 1:
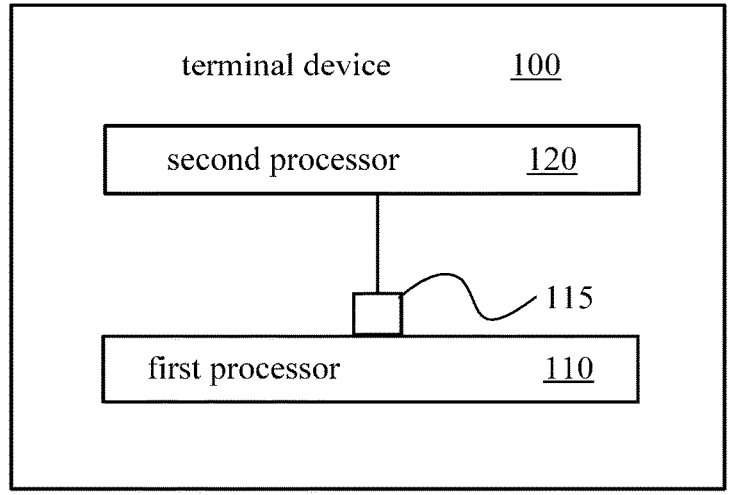
FIG. 1 is a schematic diagram showing a terminal device according to one embodiment of the present disclosure.

Please refer to FIG. 1, a schematic diagram showing a terminal device 100 according to one embodiment of the present disclosure is provided. As shown in FIG. 1, the terminal device 100 includes the following:

A first processor 110 includes a first communication interface 115. The first processor 110 is configured to receive a firmware transmitted by a second processor 120 through the first communication interface 115 when the first communication interface 115 is open. And the first processor 110 is configured to read control instructions recorded in the firmware when the terminal device 100 is coupled to an adapter, to control the adapter to charge the terminal device 100. When the first processor 110 stores no firmware, the first communication interface 115 is open.

The second processor 120 is configured to acquire the firmware from a server, and transmit the firmware by the first communication interface 115 when the first communication interface 115 is open.

The following description will specifically illustrate respective components of the terminal device 100.

A. The First Processor 110:

When the terminal device 100 is coupled to an adapter through, for example, a Universal Serial Bus (USB for short) cable, the first processor 110 is coupled to the adapter for communication. Therefore, the first processor can transmit data (such as temperature, voltage, power, or so on of the terminal device) or instructions (such as the instruction to indicate the current or voltage which the adapter needs to output) to the adapter, to control the adapter to charge the terminal device 100.

Figure 2:
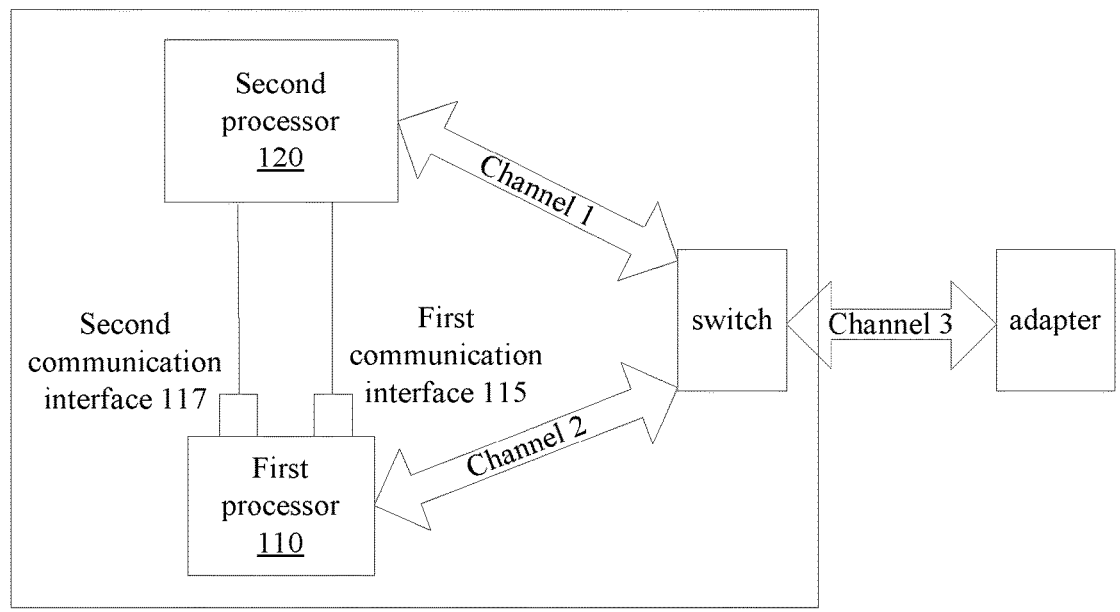
FIG. 2 is schematic diagram showing a connection manner between the terminal device and an adapter according to one embodiment of the present disclosure.
Figure 3:
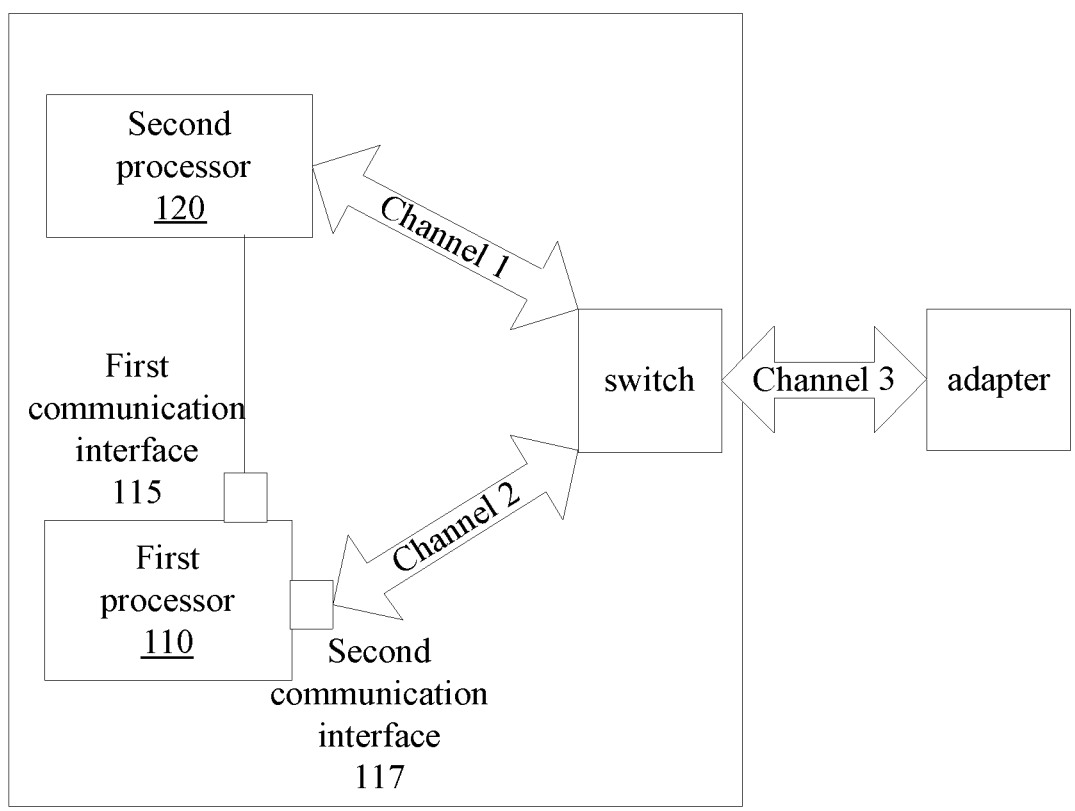
FIG. 3 is a schematic diagram showing a connection manner between the terminal device and an adapter according to another embodiment of the present disclosure.

In addition, in the embodiment of the present disclosure, for example, the communication between the terminal device 100 and the adapter can be formed by a channel 2, a switch, and a channel 3 shown by FIG. 2 or FIG. 3. The switch can be configured to switch connection status of the channel 3 to the channel 1 (that is the channel used by the second processor 120) or channel 2 (that is the channel used by the first processor 110).

It should be understood that the communication connection between the terminal device 100 and the adapter shown in FIG. 2 or FIG. 3 is illustrated as an example, which should not be construed as limitation of the present disclosure. Other embodiments of communication connection manners between the terminal device 100 and the adapter, also fall into the protection scope of the present disclosure, for example, an embodiment without switches, thus the channel 3 can be coupled to the channel 1 and the channel 2 at the same time.

In the embodiment of the present disclosure, the first processor 110 can perform the control instruction recorded in the firmware to control the method and the process that the adapter charges the terminal device 100.

In the embodiment of the present disclosure, the first processor 110 can be a microcontroller (MCU), also called single chip microcomputer, which is a central processing unit (CPU) reduced at frequency and specification, and memory, timer, USB and these kind of the peripheral interface are integrated on a single chip, to form a chip-level computer, and perform different combined controls for different applications.

B. The Second Processor 120:

In the embodiment of the present disclosure, the second process 120 can control the terminal device (such as a transceiver or so of the terminal device) through wireless communication or cable communication to acquire the firmware from the firmware server.

As an example rather than a limitation, a tag of the server (or in another way, a unique identifier information of the server, for example, the URL address or IP address of the server) can be pre-stored in the terminal device (such as a storage coupled to the second process 120 in the terminal device 100). Therefore, the second processor 120 can, according to the tag of the server, transmit the request information which is configured to request the server to send the firmware to the terminal 100 (to the second processor 120, specifically), and the request information can include relevant information of the terminal device 100 (such as phone number of the terminal device 100 or so), so that the server can authenticate the terminal device 100 based on the relevant information, and send the firmware to the terminal device 100 after pass the authentication.

As an example rather than a limitation, the request information can carry relevant information of the terminal device 100 (such as the brand, model type, manufacture of the terminal device 100 or so), so that, the server can, according to the relevant information, determine the firmware of the adapter which the terminal device 100 can connect therewith.

Optionally, the adapter is configured to charge the terminal device in a quick charging mode.

Specifically, in the embodiment of the present disclosure, when the terminal device 100 is coupled to the adapter, the second processor 120 can by, for example, the communication connection between the channel 2 and the channel 3 shown in the FIG. 2 to the adapter, determine adapter type, for example, whether charging the terminal device 100 in a quick charging mode or not.

In addition, in the embodiment of the present disclosure, the term "in a quick charging mode", means the adapter can use larger current or voltage than a common charging mode to charge the terminal device.

Optionally, the second processor is also configured to forbid the communication between the first processor and the adapter, before determining that the adapter is charging the terminal device in the quick charging mode.

Specifically, in the embodiment of the present disclosure, when the terminal device 100 is coupled to a peripheral device through the USB interface, the second processor 120 can determine the type of the peripheral device. The type of the peripheral device, can list as common adapter (that is, charging to the terminal device 100 without the control of the first processor 110), quick charging adapter, or other terminal devices (such as, a computer device).

Meanwhile, when the second processor 120 determines the type of the peripheral device is the adapter configured to charge to the terminal device 100 in the quick charging mode, the communication between the first processor 110 and the peripheral device is allowed. For example, the first processor 110 can control the switch shown in the FIG. 2, to connect the channel 2 to the channel 3.

Or, when determining the type of the peripheral device is not the adapter for charging the terminal device 100 in the quick charging mode, the second processor 120 can forbid the communication between the first processor 110 and the peripheral device. For example, the first processor 110 can control the switch shown in the FIG. 2, to disconnect the channel 2 from the channel 3.

Optionally, the second processor 120 is further configured to determine the relevant information of the adapter which is coupled to the terminal device 100, and acquire the firmware which is configured to control the adapter according to the relevant information of the adapter.

Specifically, in the embodiment of the present disclosure, the second processor 120 further can acquire the relevant information of the adapter (such as the brand, model type, manufacture of the adapter or so). Here, the relevant information of the adapter is sent from the adapter to the second processor 120. Or the relevant information of the adapter can be input by the user through input elements of the terminal device to the second processor 120, which is not limited in the present disclosure.

Thereby, the second processor 120 further can transmit the relevant information (such as carried on one message with the above request information) of the adapter to the server. Thereby, the server can, according to the relevant information of the adapter, determine which firmware can control the adapter, to further improve utility and reliability.

In addition, the process that the second processor 120 acquires the firmware, can be finished automatically after powered on, or can be done by the instruction input by the user, can be executed periodically, or can be triggered by a server, not limited strictly by the present disclosure.

The following description will illustrate specifically the process of the first processor 110 acquiring the firmware from the second processor 120.

In the embodiment of the present disclosure, the first processor 110 includes a first communication interface 115, and the first communication interface 115 can be configured to transmit the firmware from the first processor 110 to the second processor 120. And, for example, when the terminal device 100 just leaves the factory, fails to update the firmware, or formats to an original configuration, the first processor 110 stores no firmware.

In the embodiment of the present disclosure, when the first processor 110 stores no firmware, the first communication interface 115 is open.

Therefore, the second processor 120 can, through the first communication interface 115, acquire the firmware transmitted by the second processor 120.

Furthermore, in the embodiment of the present disclosure, the first communication interface transmits other data or information besides the firmware or the firmware update file (the term of the firmware update file will be described specifically in the following, subsequently), which is not limited in the present disclosure.

What should be mentioned is that, in the embodiment of the present disclosure, the first communication interface 115 can be an Inter-Integrated Circuit (I2C) interface. The I2C is a double-line serial bus interface, and is configured to connect the processor to the peripheral device. It is a bus standard in the microelectronics control field. It is a special form of synchronous communication, with advantages as less interface wire, easy control method, small unit packing form, and high communication speed.

Based on the terminal device in the embodiment of the present disclosure, the first processor of the terminal device includes the first communication interface. The first communication interface is open when the first processor stores no firmware. Therefore, the second processor can transmit the firmware acquired from the server to the first processor through the first communication interface, when the first processor stores no firmware. Furthermore, the second processor can read the control instruction recorded in the firmware, to control the adapter to charge the terminal device, and can acquire the firmware from the server suited for the adapter according to a coupled adapter. Therefore, the charge method based on the control of the terminal device can be improved to have more utility and universality.

What should be mentioned is that, in the embodiment of the present disclosure, after acquiring the firmware, the first processor 110 can store the firmware. In the embodiment of the present disclosure, the term of "store", means that the first processor 110 can store the firmware in a built-in storage medium of the first processor 110, or the first processor 110 can also store the firmware in a storage medium coupled to the first processor 110, which is not limited particularly in the present disclosure.

Optionally, when the first processor stores the firmware, the first communication interface is closed.

Specifically, in the embodiment of the present disclosure, when the first processor 110 stores the firmware, the first communication interface is closed. So that, the firmware will be re-transmitted, the energy consumption of the terminal device will be saved, and the burden of the first processor 110 and the second processor 120 will be reduced.

When upgrading hardware products and with development of the technology, one situation that the original firmware cannot meet is the user demands (such as, the firmware has bug or so). Therefore, the firmware needs to be upgraded.

In the prior art, since the firmware is stored in the processor when the terminal device is manufactured, if the firmware needs to be upgraded, the terminal device has to be returned to the factory for repair, thus seriously affecting normal use of the users, and increasing cost of the product.

In view of the above problems, the present disclosure also provides an upgrade method for the firmware stored in the first processor 110. That is:

Optionally, the first processor further includes a second communication interface maintained open. When the first communication interface is closed, the first processor receives a trigger information through the second communication interface to open the first communication interface. And through the first communication interface, the first processor receives firmware update file for the stored firmware transmitted by the second processor, and based on the firmware update file, updating the stored firmware;

The second processor is also configured to acquire the firmware stored in the first processor, from a server, and transmit the firmware update file by the first communication interface when the first communication interface is open.

Specifically, in the embodiment of the present disclosure, the second processor 120 can control the terminal device 100 (such as the transceiver of the terminal device) to acquire the firmware update file by the wireless or cable communication.

In the embodiment of the present disclosure, the firmware update file is configured to update the firmware, and a method for generating the firmware update file and a process for updating the firmware are similar to the existing technology, so here, in order to avoid redundancy, the details are omitted.

As an example rather than a limitation, the tag of the server (or in another way, a unique identifier information of the server, for example, the URL address or IP address of the server) can be pre-stored in the terminal device (such as the storage coupled to the second process 120 in the terminal device 100).Therefore, the second processor 120 can, according to the tag of the server, transmit the request information which is configured to request the server to send the firmware to the terminal 100 (specifically, to the second processor 120), and the request information can include relevant information of the terminal device 100 (such as phone number of the terminal device 100 or etc.), so that the server can authenticate the terminal device 100 based on the relevant information, and after the authentication, send the firmware to the terminal device 100.

As an example rather than a limitation, the request information can carry the relevant information of the terminal device 100 (such as the brand, model type, manufacture of the terminal device 100 or so), so that, the server can, according to the relevant information, determine the firmware of the adapter which the terminal device 100 can connect to, therefore, further improve the utility and reliability of the present disclosure.

Furthermore, in the embodiment of the present disclosure, the firmware update file can be acquired by the second processor 120 from the server according to the user operation, or acquired thereby in a manner that the second processor 120 sends a request to the sever periodically, or acquired thereby in a manner that the server sends the update file to the second processor 120 actively. For example, the server can send the firmware update file and an update file for the operating system running in the terminal device 100 together to the terminal device 100.

The following description will illustrate specifically the process of the first processor 110 acquiring the firmware from the second processor 120.

In the embodiment of the present disclosure, the first processor 110 includes a first communication interface 115, the first communication interface 115 can be configured to transmit the firmware or the firmware update file from the first processor 110 to the second processor 120. And when the first processor 110 stores the firmware, the first communication interface 115 is closed.

In the embodiment of the present disclosure, the first processor 110 further includes a second communication interface 117 kept open. The second communication interface 117 is configured to receive a trigger information, and the trigger information is configured to trigger the first communication interface 115 to open.

In the embodiment of the present disclosure, the trigger information can be a level signal with a standard mode, such as one or more low level signals, one or more high level signals, or a combination of the high level signals and the low level signals. Or the trigger information can be a digital signal or an analog signal, which is not limited particularly in the present disclosure.

As an example rather than a limitation, in the embodiment of the present disclosure, the second communication interface 117 can be a GPIO (General Purpose Input Output) interface.

In the present disclosure, the trigger information can be sent by the second processor 120 (that is, situation 1), or sent by the adapter (that is, situation 2). The following description will illustrate specifically the process of the two situations.

Situation 1:

Optionally, the trigger information is specifically sent by the second processor.

Specifically, as shown in FIG. 2, in the embodiment of the present disclosure, the second processor 120 can be coupled to the first processor 110 by the second communication interface 117. Therefore, the second processor 120 can send the trigger information to the first processor 110 through the second communication interface 117.

Optionally, the trigger information is sent after the second processor acquires the firmware update file.

Specifically, in the embodiment of the present disclosure, after acquiring the firmware update file, the second processor 120 sends the trigger information to the first processor 110. Therefore, the firmware stored in the first processor 110 can be updated in time.

It is understood that, the timing that the second processor 120 sends the trigger information to the first processor 110 listed above is only an example, not a limitation of the present disclosure. For example, the second processor 120 can also send the trigger information periodically or after the reset of the terminal device.

Situation 2:

Optionally, the trigger information is specifically sent by the adapter.

Specifically, as shown in FIG. 3, in the embodiment of the present disclosure, the terminal device 100 is configured to connect to a quick charging adapter, in the embodiment of the present disclosure, the adapter can through the second communication interface 117 connect to the first processor 110. Therefore, the adapter can send the trigger information to the first processor 110.

Optionally, the first processor is also configured to send a version instruction to the second processor through the first communication interface, the version instruction is configured to indicate the version of the firmware stored in the first processor;

The second processor is also configured to determine a transmission of the firmware update file to the first processor according to the version instruction.

Specifically, in the embodiment of the present disclosure, after receiving the trigger information, the first processor 110 opens the first communication interface 115, and through the first communication interface 115 sends the version instruction stored in the first processor 110 (or stored in a storage coupled to the first processor 110) to the second processor 120.

After receiving the version instruction, the second processor 120 can determine whether the firmware update file can be used to update the firmware stored in the first processor 110. For example, if the firmware updated by the firmware update file is in the upgrade version stored in the first processor 110 (for example, the firmware vision of the firmware update file is later than the firmware vision stored in the first processor 110), the second processor 120 can determine that the firmware update file acquired can be configured to upgrade the firmware stored in the first processor 110. Therefore, through the first communication interface 115, the firmware update file is sent to the first processor 110.

Optionally, the first processor is configured to send the version instruction to the second processor through the first communication interface, after the terminal device is restarted and coupled to the adapter in a first time.

Specifically, usually, the terminal device 100 will restart after the operating system upgrades. And the firmware used by the first processor 110 is updated at the same time with the operating system. Therefore, after the terminal device restarts, the possibility of the firmware needs to upgrade is higher. And the first processor 110 is configured to control the coupled adapter. Therefore, in the embodiment of the present disclosure, the first processor 110 can, according to the restart situation of the terminal device 100 and the connecting situation of the adapter, determine whether the firmware update file of the stored firmware sent to the second processor 10 is needed.

For example, if the current state of the terminal device 100 is: after the latest restart of the terminal device 100, and connection thereof to the quick charging adapter first time, then the terminal device 100 sends the version instruction of the presently stored firmware to the second processor 120.

Or, if the current state of the terminal device 100 is: after the latest restart of the terminal device 100, and connection thereof to the quick charging adapter not first time, then the terminal device 100 stops sending the version instruction of the presently stored firmware to the second processor 120.

Therefore, meaningless interaction between the second processor 120 and the first processor 110 can be reduced, as is energy consumption and the process burden.

And a method for determining whether the terminal device 100 is the latest restart of the terminal device 100 and coupled to the adapter first time, can be done by a counter, and each time after connection to the adapter, the counter counts, and when the terminal device restarts, the counter returns to zero, and recounts again.

In the embodiment of the present disclosure, the function of the counter can be integrated into the second processor 120 or the first processor 110, which is not limited particularly in the present disclosure.

The first processor 110, after the second processor 120 acquires the firmware update file, can update the stored firmware, and the update process is similar to the existing technology, so here, in order to avoid redundancy, the details are omitted.

Figure 4:
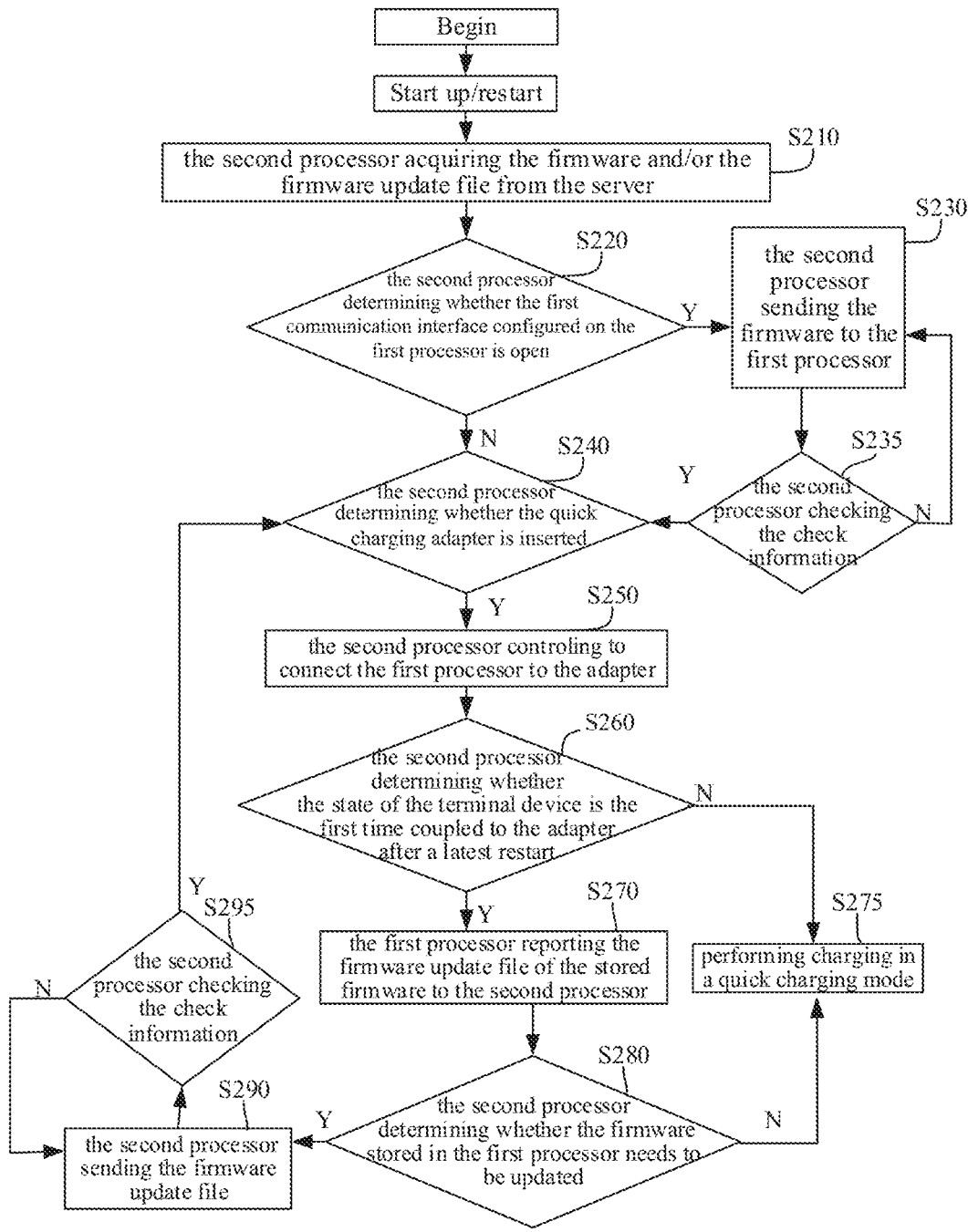
FIG. 4 is a flowchart of a charge control method according to one embodiment of the present disclosure.

FIG. 4 shows the specific process of the terminal device 100 acquiring the firmware and updating the firmware. As shown in the FIG. 4:

In block S210, the second processor 120 can acquire the firmware and/or the firmware update file from the server;

In block S220, the second processor 120 can determine whether the first communication interface 115 configured on the first processor 110 is open. For example, the second processor 120 can send a detecting signal to the first processor 110 through the first communication interface 115.

In block S220, if the second processor 120 can acquire a response from the first processor 110, it can be determined that the first communication interface 115 is open. That is, the first processor 110 stores no firmware; therefore, in block S230, the second processor 120 can send the firmware to the first processor 110 through the first communication interface 115. Furthermore, after the firmware transmission, the first processor 110 can send a check information to the second processor 120, to indicate whether the firmware can be used normally. Therefore, in block S235, the second processor 120 checks the check information, and if it is determined that the firmware can be used normally, the process proceeds to block S240. If it is determined that the firmware cannot be used normally (for example, transmitting failure), the firmware will be transmitted again.

In block S220, if the second processor 120 cannot acquire the response from the first processor 110, it can be determined that the first communication interface 115 is closed. That is, the first processor 110 stores the firmware, then in block S240, the second processor 120 determines whether the quick charging adapter is inserted.

In block S240, if the second processor 120 determines the adapter is inserted, then in block S250, the second processor 120 controls to connect the first processor 110 to the adapter, and the second processor 120 or the adapter can send the trigger information to the first processor 110 to open the first communication interface 115.

In block S240, if the second processor 120 determines the adapter is not inserted, it goes on waiting.

In block S260, the first processor 110 determines whether the state of the terminal device is the first time coupled to the adapter after a latest restart.

In block S260, if the determination is yes, in block S270, the first processor 110 can report the firmware update file of the stored firmware to the second processor 120.

In block S260, if the determination is no, in block S275, charging in a quick charging mode is performed.

In block S280, the second processor 120, according to the reported firmware from the first processor 110, determines whether the firmware stored in the first processor 110 needs to be updated.

In block S280, if the determination is no, in block S275, charging in a quick charging mode is performed.

In block S280, if the determination is yes, then in block S290, the second processor 120, through the first communication interface 115, sends the firmware update file. And, after the firmware transmission, the first processor 110 can send the check information to the second processor 120, to indicate whether the firmware can be used normally. Therefore, in block S295, the second processor 120 checks the check information, and if it is determined that the firmware can be used normally, the process proceeds to block S240. If it is determined that the firmware cannot be used normally (for example, transmitting failure), the firmware will be transmitted again.

According to the terminal device of the present disclosure, the first processor includes a first communication interface, and when the first processor stores the firmware, the first communication interface is closed. Therefore, when the first processor stores the firmware, the second processor or the adapter, can send the trigger information to the first processor, to open the first communication interface; the second processor can, through the first communication interface, transmit the firmware update file acquired from the server to the first processor. Therefore, the firmware can be upgraded completely, to further improve utility and universality of the charging method, based on the control of the terminal device.

Furthermore, the process of acquiring the firmware and the firmware update file, and the process of controlling the adapter are finished by different processors, whereby the reliability of charging can be improved.

In the embodiment of the present disclosure, the terminal device can be a device with a build-in battery such as a cellphone, flat computer, computer device, or information display device, etc., wherein the battery can be charged by an external power supply.

Take the cellphone as an example to introduce the present disclosure. In the embodiment of the present disclosure, the cellphone can include an RF circuit, a memory, an input unit, a WIFI (wireless fidelity) module, a display unit, a sensor, an audio circuit, a processor, a projection unit, a film unit, a battery and components like that.

The RF circuit can be configured to receive and send signals when transceiving the messages or a phone call in a communication. Especially, the RF circuit receives down-link signals from a station, and sends them to the processor, or sends up-link data in the cellphone to the station. Usually, the RF circuit includes but not limited to an antenna, at least one amplifier, a transceiver, a coupler, a low noise amplifier, a duplexer, and so on. In addition, the RF circuit can also communicate with other device by the wireless communication or network. The wireless communication can be any communication standard or protocol, includes but not limited to GSM (Global System for Mobile communication), GPRS (General Packet Radio Service), CDMA (Code Division Multiple Access), WCDMA (Wideband Code Division Multiple Access), LTE (Long Term Evolution), E-mail, SMS (Short Messaging Service), etc.

Among them, the memory can be configured to store the software programs and modules, the processor by running the software programs and modules stored in the memory, performs the function applications and data processing of the cellphone. The memory can mainly include a program storage area and a data storage area. Among them, the program storage area can store the operating system, at least one function application (for example voice broadcast function, image display function or so) and so on; the data storage area can store the data created by the usage of the cellphone (for example, audio data, telephone directory or so) and so on. Furthermore, the memory can include a high speed random access memory, and a nonvolatile memory, for example, at least one disk memory, a flash memory, or other volatile solid storage device.

The input unit can be configured to receive inputting numbers or character information, and produce key signals related to user setting and function controlling in the cellphone. Specifically, the input unit can include the touch panel and other inputting device. The touch panel, also called touch screen, can collect touch operation on or near it (for example, the user uses any suitable object such as a finger, or a touch pen, operates on or near the touch panel), and according to the preset program drive the coupled device. Optionally, the touch panel includes two parts of a touch detecting unit and a touch controller. Among them, the touch detecting unit detects the touching direction of the user, and detects the signal generated by the touch operation, and sends the signal to the touch controller. The touch controller receives the signal from the touch detecting unit, and converts it to touch point coordinate, then sends to the processor, and receives and executes the commands from the processor. Additionally, the touch panel can be a resistive, capacitive, infrared, and surface acoustic wave and these variety of types to implement. Besides the touch panel, the input unit can also include other input device. Specifically, the input unit can include but not limited to one or more of a physical keyboard, a function keys (such as a volume control button, a power button and etc.), a trackball, a mouse, and an operating lever.

Among them, the display unit can be configured to display the information input by the user, the information provided for the user, and all kinds of cellphone menus. The display unit can include a display panel, optionally, the display panel can be set by the form of LCD (liquid crystal display), OLED (organic light-emitting diode), and etc. Furthermore, the touch panel can cover the display panel, when the touch panel detects touch operations on or near it, and send it to the processor to determine a type of touch event. The processor, according to the type of the touch event, provides a corresponding visual output on the display panel.

Among them, the position on the display panel for visual output to be recognized by the human eyes, can be considered as a "display area." The touch panel and the display panel can be assumed to be two independent parts to achieve the function of input and output, or the touch panel and the display panel can be integrated to achieve the function of input and output.

Additionally, the cellphone further includes at least one sensor, such as a voltage sensor, a temperature sensor, a posture sensor, an optical sensor, and other sensors.

Specifically, the posture sensor, also called a motion sensor. And as one of the motion sensor, a gravity sensor (G-sensor) can be listed. The G-sensor includes a cantilever shifter made by elastic sensitive element, and an energy storage spring made by elastic sensitive element to drive the electric contact, so as to realize the charge from the gravity charge into an electrical signal.

As another one of the motion sensor, an acceleration sensor can be listed. The acceleration sensor can detect acceleration speed on all directions (generally up to three axis), can detect magnitude and direction of the gravity when still, and can identify a gesture of the cellphone application (such as a screen switch between landscape style and portrait style, relevant games, and magnetometer calibration) and identify the vibration function (such as pedometer, and knock), and so on.

In the embodiment of the present disclosure, the listed motion sensor can be a component to acquire "posture parameters", but it is not a limitation, other sensors which can acquire the "posture parameters" also fall into the protection scope of the present disclosure. For example, a gyroscope and others, where the working principle and data processing procedure of the gyroscope is similar to the existing technology, so here, in order to avoid redundancy, the details are omitted.

Additionally, in the embodiment of the present disclosure, as a sensor, a barometer, a hygrometer, a thermometer, an infrared sensors and other sensor can be configured, the details are not repeated here.

The optical sensor can include an ambient light sensor and a proximity sensor. Among them, the ambient light sensor can according to bright or dark of the ambient light adjust the brightness of the display panel. The proximity sensor can be positioned close the display panel or the back light when the cellphone is closed to an ear.

The audio circuit, a speaker, and a microphone, can provide an audio interface between the user and the cellphone. The audio circuit can convert the received audio data into electrical signal, and transmit to the speaker, and output as the audio signal by the speaker; on the other hand, the speaker can convert the collected audio signal into the electrical signal, and the audio circuit converts into the audio data after received, and the processor send the output audio data to another cellphone by RF circuit, or output the audio data to the memory for further processing.

WIFI belongs to short distance wireless transmission technology, cellphone can be configured to send and receive email, browse a web page, and access streaming media, etc. by the WIFI module. It provides a user with wireless broadband Internet access. In addition, this module can be omitted according to the requirement within the scope of the present disclosure.

In the embodiment of the present disclosure, the second processor can be the control center of the cellphone, use all kinds of interfaces and bus lines to connect all parts of the entire cellphone, by running and executing software programs and modules stored in the memory, and call data stored in the memory to execute all kinds of functions and process the data, so as to monitor the entire cellphone. Optionally, the second processor can include one or more processing units. Optionally, the processor can integrate an application processor and a modem processor. Among them, the application processor mainly deals with the operating system, the user interface, and the applications. The modern processor mainly deals with the wireless communication.

It should be understood that, the modem processor can also be not integrated into the second processor.

The cellphone further includes a power supply (such as a battery), to supply power to each component.

Optionally, the power supply can be logically coupled to the processor through the power management system, and through the power management system to implement the function of charging, discharging, and power consumption. Although not shown, the cellphone can further include a Bluetooth module, the details are not repeated here.

What should be mentioned is that, the cellphone is only an example of the terminal device, which is not particular limited, the present disclosure can be applied in cellphone, tablet computer, and other electronic device, which is not limited in the present disclosure.

FIG. 5 is a flowchart of a charge control method 300 according to another embodiment of the present disclosure. The method 300 is applied in a terminal device comprising at least two processors. As shown in FIG. 5, the method 300 includes:

In block S310, a second processor in the at least two processors acquires a firmware from a server. When a first communication interface configured on a first processor in the at least two processors is open, through the first communication interface, the second processor transmits the firmware to the first processor, wherein when the first processor stores no firmware, the first communication interface is open.

In block S320, when the terminal device is coupled to an adapter, the first processor reads control instructions recorded in the firmware to control the adapter to charge the terminal device.

Optionally, when the first processor stores the firmware, the first communication interface is closed.

Optionally, the first processor includes a second communication interface maintain open, the method further includes:

The second processor is also configured to acquire a firmware update file from the server for the firmware stored in the first processor.

When the first communication interface is closed, the first processor, through the second communication interface, receives a trigger information.

The first processor, according to the trigger information, opens the first communication interface.

The first processor, through the first communication interface, receives the firmware update file for the stored firmware transmitted by the second processor.

The first processor based on the firmware update file, updates the stored firmware.

Optionally, the trigger information is sent by the second processor.

Optionally, the trigger information is sent after the second processor acquires the firmware update file.

Optionally, the trigger information is sent by the adapter.

Optionally, the method further includes:

The first processor, through the first communication interface, sends a version instruction to the second processor, the version instruction for indicating the version of the firmware stored in the first processor.

The second processor, according to the version instruction, transmits the firmware update file to the first processor.

Optionally, before the first processor, through the first communication interface, sends the version instruction to the second processor, the method further includes:

The first processor determines a current connection state of the terminal device, and the terminal device is restarted and coupled to the adapter first.

Optionally, the adapter is configured to charge the terminal device in a quick charging mode.

Optionally, the method further includes:

Before the second processor determines that the adapter is charging the terminal device in the quick charging mode, forbidding the communication between the first processor and the adapter.

In the method 300, the actions and process of the first processor are similar to the actions and process of the first processor 110 in the terminal device, so here, in order to avoid redundancy, the details are omitted.

And, in the method 300, the actions and process of the second processor is similar to the actions and process of the second processor 120 in the terminal device, so here, in order to avoid redundancy, the details are omitted.

Based on the terminal device and the charge control method provided by the embodiment of the present disclosure, the first processor of the terminal device includes the first communication interface. The first communication interface is open when the first processor stores no firmware. Therefore, the second processor can transmit the firmware acquired from the server to the first processor through the first communication interface, when the first processor stores no firmware. Furthermore, the second processor can read the control instruction recorded in the firmware, to control the adapter to charge the terminal device, and can acquire the firmware from the server suited for the adapter according to a coupled adapter. Therefore, the charge method based on the control of the terminal device can be improved to have more utility and universality.

It should be understood that, in the embodiment of the present disclosure, the serial number of the above process does not mean execution sequence, the execution sequence of each process should be defined by the function and internal logic, and should not be any limitation for the implementation in the embodiment of the present disclosure.

It should be realized by the common skilled personnel in this filed, combined with the unit and algorithm step public in the embodiment of the present disclosure, it can be implement by electronic hardware, or computer software with the electronic hardware. These functions will be executed by hardware or software, that depends on the specific application and constraint conditions of the technical solutions. The skilled personnel can use different methods to achieve the described function according to each specific application, but this achievement should not be considered as outside the scope of the present disclosure.

The skilled personnel in this filed can clearly understand, to describe conveniently and concisely, the specific working process of the above system, device, and unit, can refer to the corresponding process of the embodiment of the above method, which is not repeated here.

In the several embodiments provided in the present application, it should be understood that the disclosed system, apparatus, and method can be implemented in other manners. For example, the described apparatus embodiment is merely exemplary. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections are implemented through some interfaces. The indirect couplings or communication connections between the apparatuses or units can be implemented in electronic, mechanical, or other forms.

The units described as separate parts can or cannot be physically separate, and parts displayed as units can or cannot be physical units, can be located in one position, or can be distributed on a plurality of network units. A part or all of the units can be selected according to actual needs to achieve the objectives of the solutions of the embodiments of the present disclosure.

In addition, functional units in each embodiment of the present disclosure can be integrated into a processing unit, or each of the units can exist alone physically, or two or more units can be integrated into a unit. The integrated unit can be implemented in the form of hardware, or can be implemented in the form of a software functional unit.

When the integrated unit is implemented in the form of a software functional unit and sold or used as an independent product, the integrated unit can be stored in a computer-readable storage medium. Based on such understanding, the technical solutions of the present disclosure essentially, or the part contributing to the prior art, or all or a part of the technical solutions can be implemented in the form of software product. The computer software product is stored in a storage medium and includes several instructions for instructing a computer device (which can be a personal computer, a server, a processor, a network device, or the like) to perform all or a part of steps of the method described in each embodiment of the present disclosure. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing description is merely about the specific embodiments of the present disclosure, but is not intended to limit the protection scope of the present disclosure. Any equivalent modification or replacement figured out by persons skilled in the art within the technical scope of the present disclosure shall fall within the protection scope of the present disclosure. Therefore, the protection scope of the present disclosure shall be subject to the protection scope of the claims.

What is claimed is:

1. A terminal device comprising a first processor and a second processor, wherein, the first processor comprises a first communication interface, the first processor is configured to receive a firmware transmitted by the second processor through the first communication interface when the first communication interface is open, and the first processor is configured to read control instructions recorded in the firmware when the terminal device is coupled to an adapter, to control the adapter to charge the terminal device, wherein the firmware is suited for the adapter and is configured to control the adapter; the first communication interface is open when the first processor stores no firmware and the first communication interface is closed to prevent transmission of the firmware from the second processor to the first processor when the firmware is stored in the first processor; and the second processor is configured to acquire the firmware from a server, and transmit the firmware to the first processor by the first communication interface when the first communication interface is open.

2. The terminal device as claimed in claim 1, wherein the first processor further comprises a second communication interface maintained open, the first processor is further configured to receive a trigger information through the second communication interface when the first communication interface is closed, according to the trigger information, the first processor is further configured to open the first communication interface to receive a firmware update file for the stored firmware transmitted by the second processor through the first communication interface, and update the stored firmware based on the firmware update file; and the second processor is configured to acquire the firmware update file from the server for the firmware stored in the first processor, and transmit the firmware update file to the first processor through the first communication interface when the first communication interface is open.

3. The terminal device as claimed in claim 2, wherein the trigger information is sent by the second processor.

4. The terminal device as claimed in claim 3, wherein the trigger information is sent after the second processor acquires the firmware update file.

5. The terminal device as claimed in claim 2, wherein the trigger information is sent by the adapter.

6. The terminal device as claimed in claim 2, wherein the first processor is further configured to send a version instruction to the second processor through the first communication interface, the version instruction is configured to indicate a version of the firmware stored in the first processor; and the second processor is configured to determine the firmware update file transmitted to the first processor, according to the version instruction.

7. The terminal device as claimed in claim 6, wherein the first processor is configured to send the version instruction to the second processor, through the first communication interface, after the terminal device is restarted and coupled to the adapter in a first time.

8. The terminal device as claimed in claim 1, wherein the adapter is configured to charge the terminal device in a quick charging mode.

9. The terminal device as claimed in claim 8, wherein the second processor is further configured to forbid the communication between the first processor and the adapter, before determining that the adapter is charging the terminal device in the quick charging mode.

10. A charge control method, applied in a terminal device comprising a first processor and a second processor, wherein the method comprises:

acquiring a firmware from a server by the second processor, and transmitting the firmware to the first processor through a first communication interface when the first communication interface configured by the first processor is open, wherein the firmware is suited for the adapter and is configured to control the adapter; the first communication interface is open when the first processor stores no firmware and the first communication interface is closed to prevent transmission of the firmware from the second processor to the first processor when the first processor stores the firmware; and reading control instructions recorded in the firmware by the first processor, to control the adapter to charge the terminal device, when the terminal device is coupled to an adapter.

11. The method as claimed in claim 10, wherein the first processor comprises a second communication interface maintain open, the method further comprises:

acquiring a firmware update file by the second processor from the server for the firmware stored in the first processor;

receiving a trigger information through the second communication interface by the first processor, when the first communication interface is closed;

opening the first communication interface by the first processor according to the trigger information;

receiving the firmware update file for the stored firmware transmitted by the second processor, by the first processor through the first communication interface; and updating the stored firmware, by the first processor based on the firmware update file.

12. The method as claimed in claim 11, wherein the trigger information is sent by the second processor.

13. The method as claimed in claim 12, wherein the trigger information is sent after the second processor acquires the firmware update file.

14. The method as claimed in claim 11, wherein the trigger information is sent by the adapter.

15. The method as claimed in claim 11, wherein the method further comprises:

sending a version instruction to the second processor through the first communication interface by the first processor, the version instruction is configured to indicate a version of the firmware stored in the first processor; and transmitting the firmware update file to the first processor, according to the version instruction, by the second processor.

16. The method as claimed in claim 15, wherein before sending the version instruction to the second processor, through the first communication interface by the first processor, the method further comprises:

determining, by the first processor, a current connection state of the terminal device after the terminal device is restarted recently and coupled to the adapter in a first time.

17. The method as claimed in claim 10, wherein the adapter is configured to charge the terminal device in a quick charging mode.

18. The method as claimed in claim 17, wherein the method further comprises:

forbidding the communication between the first processor and the adapter, before the second processor determines whether the adapter is charging the terminal device in the quick charging mode.

* * * * *